Sept. 29, 1936.　　D. L. STULL ET AL　　2,055,735
ICE CREAM FREEZER
Filed March 29, 1935　　2 Sheets-Sheet 1

Inventors
D. L. Stull.
M. D. Grayson.
By
Lacey & Lacey,
Attorneys

Sept. 29, 1936.　　　D. L. STULL ET AL　　　2,055,735
ICE CREAM FREEZER
Filed March 29, 1935　　　2 Sheets-Sheet 2

Inventors
D. L. Stull.
M. D. Grayson.
By Lacey & Lacey,
Attorneys

Patented Sept. 29, 1936

2,055,735

UNITED STATES PATENT OFFICE 2,055,735

ICE CREAM FREEZER

David Lewis Stull and Mercer David Grayson, Birmingham, Ala.

Application March 29, 1935, Serial No. 13,748

5 Claims. (Cl. 62—116)

This invention relates to an ice cream freezer constituting an accessory for a mechanical refrigerator, the device being so constructed that it may be mounted in a mechanical refrigerator of a conventional construction or externally thereof and the freezing medium for the ice cream freezer supplied through a coil constituting an extension of the usual freezing coil provided for the ice trays of the refrigerator or formed by a separate tube connected with the compressor or leading from a portion of the tube forming the cooling coil of the ice pans between this coil and the compressor.

At the present time, ice cream is made in a mechanical refrigerator by pouring the mixture into one of the freezing pans of the refrigerator but this has not been found satisactory as still freezing takes place instead of having the mixture agitated while freezing and the cream when frozen usually contains ice crystals instead of being a smooth fluffy mass.

Therefore, one object of the invention is to provide an ice cream freezer which is mounted in the refrigerator adjacent the ice pans and cooling unit and includes a dasher rotated from an electric motor during the freezing operation and thus causing the cream to be frozen in the same manner it would in a hand or motor operated freezer of the dasher type.

Another object of the invention is to provide a device of this character wherein the cream container and dasher are detachably mounted and may be very easily thrust into a position in which the container is surrounded by a cooling coil and the dasher coupled to a shaft rotated from a motor.

Another object of the invention is to provide a device of this character of such construction that with the dasher removed, the container may be employed as an auxiliary freezing chamber wherein ice blocks which have been previously frozen in a pan may be stored without melting, or other articles placed which it is desired to store at a low temperature.

Another object of the invention is to provide the improved freezer with a driving motor and gearing for the dasher, the gearing being mounted in a housing which is detachably secured to the motor housing so that it may be easily detached when cleaning or repairs to the gears are necessary.

The invention is illustrated in the accompanying drawings, wherein

The mechanical refrigerator, which is indicated in general by the numeral 1, is of a conventional construction and provided with the usual door 2 which, when opened, affords access to the interior of the refrigerator. A cooling unit 3, which is also of a conventional construction, is mounted in the upper portion of the refrigerator and formed with the usual shelves upon which pans 4 are placed in order that blocks of ice may be formed. This cooling unit has been shown located midway the width of the refrigerator but it will be understood that it may be disposed closer to one side if so desired.

Figure 1:
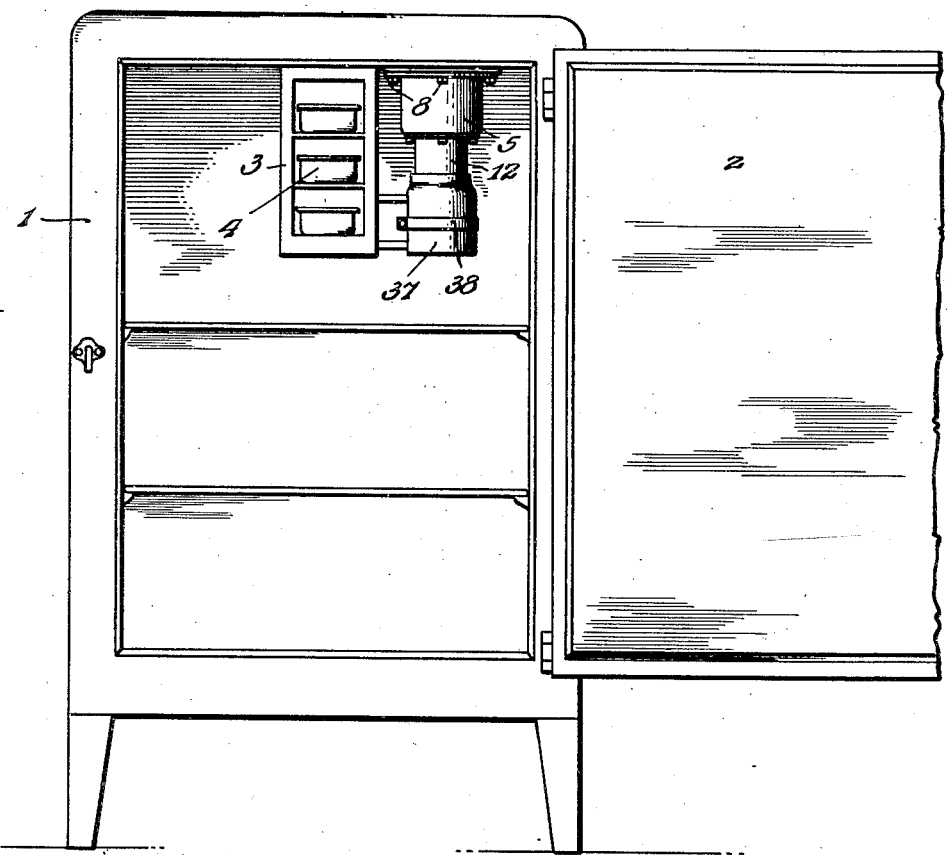
Figure 1 is a view in front elevation of a mechanical refrigerator having the improved ice cream freezer mounted therein.

In order to permit ice cream to be formed there has been provided a freezer which may be mounted externally of the refrigerator but is preferably located within the refrigerator at one side of the cooling unit, and referring to Figure 1 it will be seen that this freezer has a motor 5 which is secured against the upper wall of the refrigerator compartment. The motor has a casing 6 having a detachable head or top 7 which is firmly secured by the bolts 8 through the medium of which the device is secured to the top or upper wall of the refrigerator. Within the motor casing there is mounted the usual field coil 9 and rotor 10. The rotor 10 has its shaft 11 journaled in bearings carried by the head 7 and the lower end wall of the casing 6, the lower portion of the shaft being extended from the motor casing and formed with a squared end.

Figure 2:
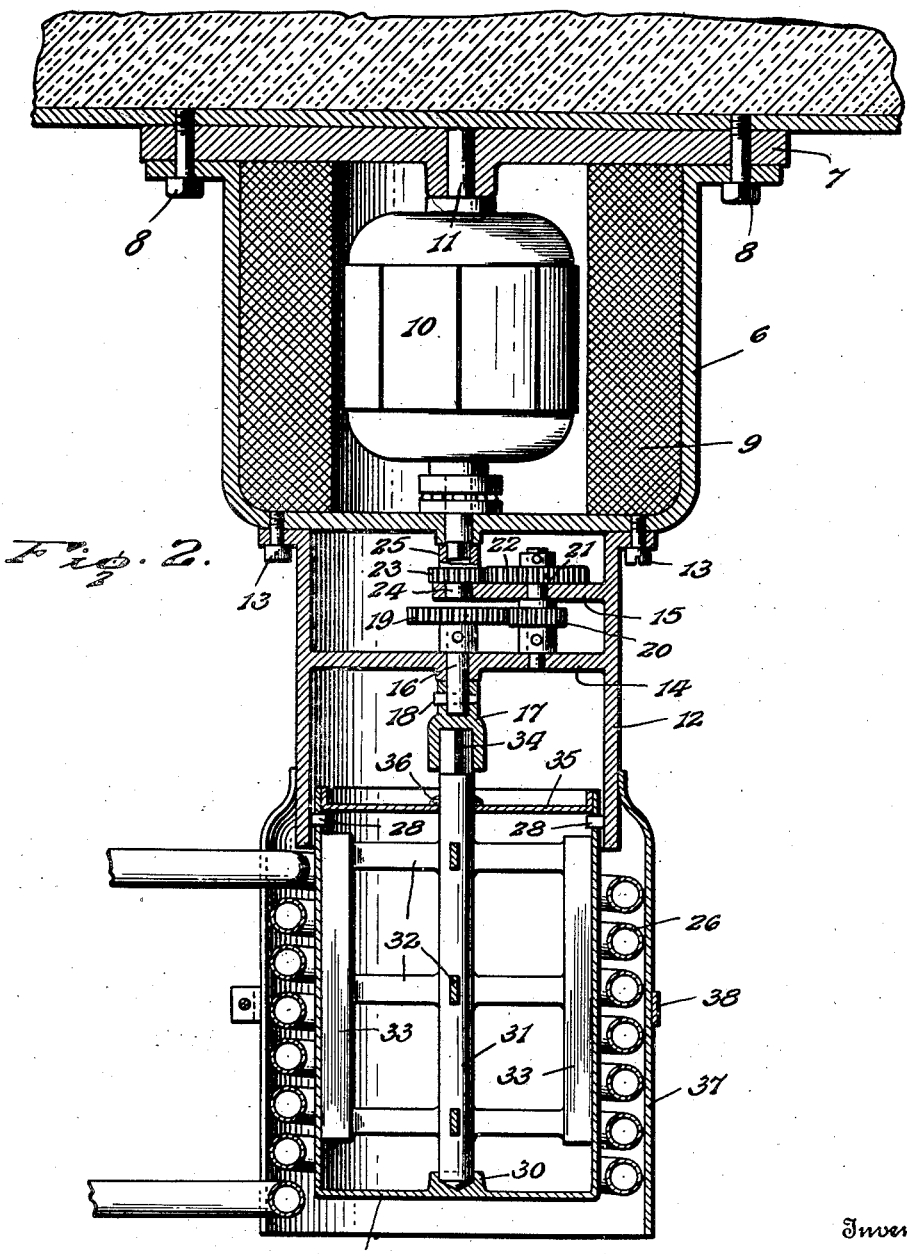
Figure 2 is an enlarged sectional view taken vertically through the ice cream freezer.

A gear casing 12 is disposed under the motor where it is firmly but detachably secured by bolts 13 threaded into the motor casing. Referring to Figure 2 it will be seen that the gear casing is open at its upper and lower ends but has its upper end closed by the motor casing when in place. A partition 14, which is formed intermediate the height of the gear casing, divides this casing into upper and lower compartments, and intermediate the depth of the upper compartment is disposed a bracket or arm 15 formed integral with walls of the gear casing. A driven shaft 16 is journaled through the partition 14 centrally thereof and in axial alinement with the motor shaft 11. Below the partition the driven shaft carries a socket 17 which is detachably secured by a pin 18 and above the partition this shaft carries a gear 19 meshing with a smaller gear 20 pinned to a countershaft 21. The shaft 21 is journaled through the partition and the bracket 15 and above the bracket carries a gear 22 which is of approximately the same size as the gear 19 and meshes with a smaller gear 23 of approximately the size of the gear 20. This gear 23 has a depending stem or stub shaft 24 journaled through the supporting bracket in axial alinement with the shaft 11 and the shaft 16, the upper portion of the gear being formed with a hub extension constituting a socket into which fits the squared lower end of the motor shaft. It will thus be seen that when the gear casing is secured to the motor casing, the lower end of the motor shaft will be engaged in the socket 25 and when the motor is started, rotary motion will be transmitted through the train of gearing to the shaft 16, but this driven shaft 16 will be rotated at a greatly reduced speed and the driven shaft will turn at the normal speed of the shaft with which an ice cream freezer dasher is connected. If so desired the gearing may be omitted and a slow motion motor employed having its shaft extending downwardly into the casing 12 and having a socket at its lower end.

Figure 3:
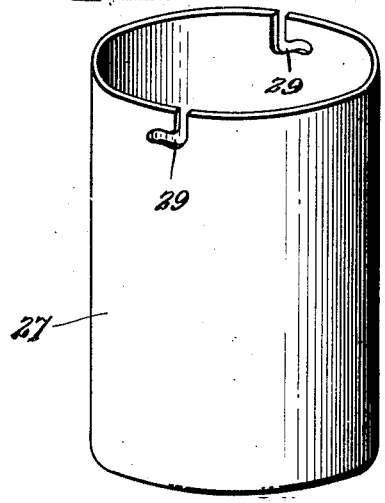
Figure 3 is a perspective view of the container forming part of the freezer.

The cooling coil of the unit 3 has a portion extended to form a helical coil 26 disposed below the gear casing. As previously stated, the coil 26 may constitute an extension of the coil of the cooling unit 3 or formed from a separate tube associated with the compressor. If so desired, one or more valves may be provided for cutting off circulation of cooling fluid through the coil 26 when the freezer is not in use. The motor may have a thermostat control built into it so that when the cream has been frozen, the load will stop the motor. The mixture which is to be formed into ice cream is poured into a container 27 which is open at its top, as shown in Figure 3, and is of such diameter that it may be easily thrust upwardly into the lower compartment of the gear casing. When this container is thrust upwardly into place, pins 28, which project inwardly from walls of the gear casing in opposed relation to each other, engage in bayonet slots 29 formed in walls of the container. It is then merely necessary to turn the container a short distance to move the pins into ends of the horizontally extending portions of the bayonet slots and the container will be suspended from the gear casing with the coil 26 surrounding it. A bearing 30 is formed at the center of the bottom of the container to receive the lower end of the dasher shaft 31 from which extend arms 32 carrying blades 33, and the shaft is of such length that its upper portion projects out of the container and terminates in a squared end 34 which fits into the socket 17 when the container is thrust into place. A cover or lid 35 for the container fits about the dasher shaft below its squared end and may be firmly secured thereon by solder, as shown at 36, or removably carried by the dasher. This cover is so located upon the dasher shaft that when the dasher is in place within the container, the cover will fit snugly into the container above the horizontally extending portions of the bayonet slots. Slots or recesses must, of course, be formed in marginal portions of the cover in order that the pins 28 may pass through the cover as they move downwardly through the vertically extending portions of the bayonet slots. A shelf or other support may be provided to engage under the container and relieve the pins from strain.

When this ice cream freezer is in use, the mixture is poured into the container and the dasher set in place with the lid or cover 35 closing the upper end of the container. The container is then thrust through the coil 26 until its upper end enters the lower end of the gear casing and the squared end of the dasher shaft moves into the socket 17. During this movement, the pins 28 enter the bayonet slots and when the container is turned a short distance to move the pins into inner ends of the horizontally extending portions of the bayonet slots, the container will be suspended from the gear casing. The switch for the motor which will be located at a convenient point, either internally or externally of the refrigerator, can then be turned on, and as the rotor 10 of the motor turns, rotary motion will be transmitted from the shaft 11 through the train of gearing to the shaft 16 at a reduced rate of speed and the dasher will turn with this driven shaft at a normal rate of speed. The cooling fluid passing through the coil 26 will cause the mixture in the container to be frozen and since the mixture will be agitated by the dasher during the freezing operation, a smooth and fluffy ice cream will be formed. A shield 37 which surrounds the coil 26 and lower end of the gear casing is secured by a band 38 and, therefore, the coil will be confined in close relation to the container and heat will be quickly absorbed. After the ice cream has been formed, the motor will be shut off and the container withdrawn. The dasher will then be removed and the container, with the frozen cream still remaining in it, again thrust upwardly into place so that the ice cream will be prevented from melting. A cover or other suitable closure may be applied to the upper end of the container before it is replaced to preclude any possibility of the ice cream becoming contaminated, but this is not liable to happen as the gearing, with the exception of the socket 17, is above the partition 14. When the device is not being used to make ice cream, the container may be employed as a storage receptacle for ice cubes or for storage of other food products which it is desired to keep very cold before being used. When cleaning or repairs are necessary, the shield 37 will be removed and the gear casing can then be detached from the motor, or the motor and gear casing removed as a unit.

Having thus described the invention, what is claimed as new is:

1. In a refrigerator, a cooling unit including a coil having a portion extended and formed into a vertically disposed helical coil at one side of the cooling unit open at its top and bottom, and a freezer having a container thrust upwardly into the coil through the open lower end thereof and surrounded by the helical coil, a dasher disposed vertically in said container and projecting upwardly therefrom, and means adapted to detachably engage the upper portion of the container and suspend the container in the coil and impart motion to the dasher.

2. In a refrigerator, a cooling unit including a tube forming a coil and having a portion extended and formed into a vertically disposed helical coil spaced from the cooling unit and open at its upper and lower ends, and an ice cream freezer having a container thrust upwardly into the helical coil through the open lower end thereof and surrounded by the said coil with its upper end projecting from the coil, an agitator in said container projecting from the upper end thereof, means to detachably engage the upper end of said container and suspend the container in the coil, and means carried by the last mentioned means to detachably engage the upper end of the agitator and impart motion to the agitator.

3. An ice cream freezer constituting an accessory for a mechanical refrigerator and comprising a container, means to suspend the container from its upper end in a vertical position, a cooling coil disposed vertically and extending about said container and being open at its upper and lower ends and constituting an extension from the cooling unit of the refrigerator, a dasher mounted vertically in said container and having its shaft projecting upwardly therefrom, a cap carried by said shaft and constituting a closure for the upper end of said container, and means connected with the dasher shaft for imparting rotary motion to the dasher.

4. An ice cream freezer constituting an accessory for a mechanical refrigerator and comprising a motor adapted to be mounted in a vertical position, a casing carried by and depending from said motor and open at its lower end, mechanism in said casing driven from the motor and including a rotary shaft disposed vertically in the casing and having a socket at its lower end, a container of a diameter to have its upper end thrust upwardly into the lower end of said casing, means to detachably hold said container suspended from the casing, a dasher disposed vertically in said container and having its shaft extending upwardly from the upper end thereof and engaged in said socket when the container is suspended from the casing, a cooling coil about said container open at its upper and lower ends whereby the container may be thrust upwardly through the coil and into the lower end of the casing, and a tubular shield secured about the lower portion of said tubular casing and extending downwardly therefrom about the coil enclosing the cooling coil.

5. An ice cream freezer constituting an accessory for a mechanical refrigerator and comprising a motor, means for securing the motor in a vertical position against the inner face of the upper wall of a refrigerator, a casing detachably secured against the lower end of said motor and open at its lower end, a driven shaft journaled vertically in said casing, means in said casing for transmitting rotary motion from said motor to the driven shaft, a socket carried by the lower end of said driven shaft, a container open at its upper end and having its upper end portion thrust upwardly into the lower end of the casing, means to detachably suspend the container from the casing, a dasher disposed vertically in said container and having its shaft extending upwardly therefrom and removably engaged in said socket, a cooling coil about said container open at its upper and lower ends whereby the container may be thrust upwardly through the coil into the lower end of the casing.

DAVID LEWIS STULL.
MERCER DAVID GRAYSON.